United States Patent
Suni et al.

(10) Patent No.: US 9,319,457 B2
(45) Date of Patent: Apr. 19, 2016

(54) METHODS AND APPARATUS FOR PROVIDING OFFLOAD CONFIGURATION INFORMATION FOR AN APPLICATION

(71) Applicant: NOKIA SIEMENS NETWORKS OY, Espoo (FI)

(72) Inventors: Mikko Tapani Suni, Espoo (FI); Swaminathan Arunachalam, Coimbatore (IN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 419 days.

(21) Appl. No.: 13/875,614

(22) Filed: May 2, 2013

(65) Prior Publication Data

US 2013/0297729 A1 Nov. 7, 2013

Related U.S. Application Data

(60) Provisional application No. 61/641,531, filed on May 2, 2012.

(51) Int. Cl.
| | |
|---|---|
| G06F 15/16 | (2006.01) |
| H04L 29/08 | (2006.01) |
| H04W 4/00 | (2009.01) |
| G06F 21/62 | (2013.01) |
| H04L 29/06 | (2006.01) |
| H04W 12/08 | (2009.01) |

(52) U.S. Cl.
CPC .............. *H04L 67/10* (2013.01); *G06F 21/629* (2013.01); *H04L 63/0823* (2013.01); *H04L 67/34* (2013.01); *H04W 4/003* (2013.01); *H04W 12/08* (2013.01)

(58) Field of Classification Search
CPC ..... H04L 67/10; H04L 63/0823; H04L 67/34; G06F 21/629; H04W 4/003
See application file for complete search history.

(56) References Cited

U.S. PATENT DOCUMENTS

| | | | | |
|---|---|---|---|---|
| 7,424,710 | B1 * | 9/2008 | Nelson et al. | 718/1 |
| 7,580,415 | B2 * | 8/2009 | Hudson et al. | 370/395.6 |
| 7,707,185 | B1 * | 4/2010 | Czezatke et al. | 707/649 |
| 8,296,759 | B1 * | 10/2012 | Hutchins et al. | 718/1 |
| 8,693,367 | B2 * | 4/2014 | Chowdhury et al. | 370/253 |
| 2006/0248191 | A1 * | 11/2006 | Hudson et al. | 709/226 |
| 2010/0192212 | A1 | 7/2010 | Raleigh | |
| 2011/0075557 | A1 | 3/2011 | Chowdhury et al. | |
| 2011/0202916 | A1 * | 8/2011 | VoBa et al. | 718/1 |

(Continued)

OTHER PUBLICATIONS

"3rd Generation Partnership Project; Technical Specification Group Services and System Aspects; Local IP Access and Selected IP Traffic Offload (Release 10)"; 3GPP Standard; 3GPP 23.829; 3rd Generation Partnership Project (3GPP); Mobile Competence Centre; 650, Route des Lucioles; F-06921 Sophia-Antipolis Cedex; France; No. V1.3.0, Sep. 22, 2010, pp. 1-44, XP050442123, [retrieved on Sep. 22, 2010] cited in the application, pp. 23-24; pp. 28-30.

(Continued)

*Primary Examiner* — Moustafa M Meky
(74) *Attorney, Agent, or Firm* — Squire Patton Boggs (US) LLP

(57) ABSTRACT

A method comprises providing to an application environment, offload configuration information for an application and application information, said application information comprising one or more of network properties and operator properties for said application.

23 Claims, 4 Drawing Sheets

(56) References Cited

U.S. PATENT DOCUMENTS

2012/0020260 A1* 1/2012 Chen et al. .................. 370/310
2012/0047551 A1 2/2012 Pattar et al.
2012/0064908 A1 3/2012 Fox et al.
2013/0125125 A1* 5/2013 Karino et al. ................ 718/1

OTHER PUBLICATIONS

3rd Generation Partnership Project; Technical Specification Group Services and Systems Aspects; Local IP Access and Selected IP Traffic Offload (LIPA-SIPTO) (Release 10); 3GPP TR 23.829 V10.0.1 (Oct. 2011); 3rd Generation Partnership Project (3GPP); Mobile Competence Centre; 650, Route des Lucioles; F-06921 Sophia-Antipolis Cedex; France; pp. 1-43.

M. Cotton et al: "Special Use IPv4 Addresses"; Jan. 2010; Internet Engineering Task Force (IETF); Request for Comments: 5735; BCP: 153; Obsoletes: 3330; ISSN: 2070-1721; pp. 1-11.

P. Srisuresh et al: "IP Network Address Translator (NAT) Terminology and Considerations"; Aug. 1999; Network Working Group; Request for Comments: 2663; pp. 1-30.

International Search Report application No. PCT/EP2013/059129 issued Aug. 6, 2013.

* cited by examiner

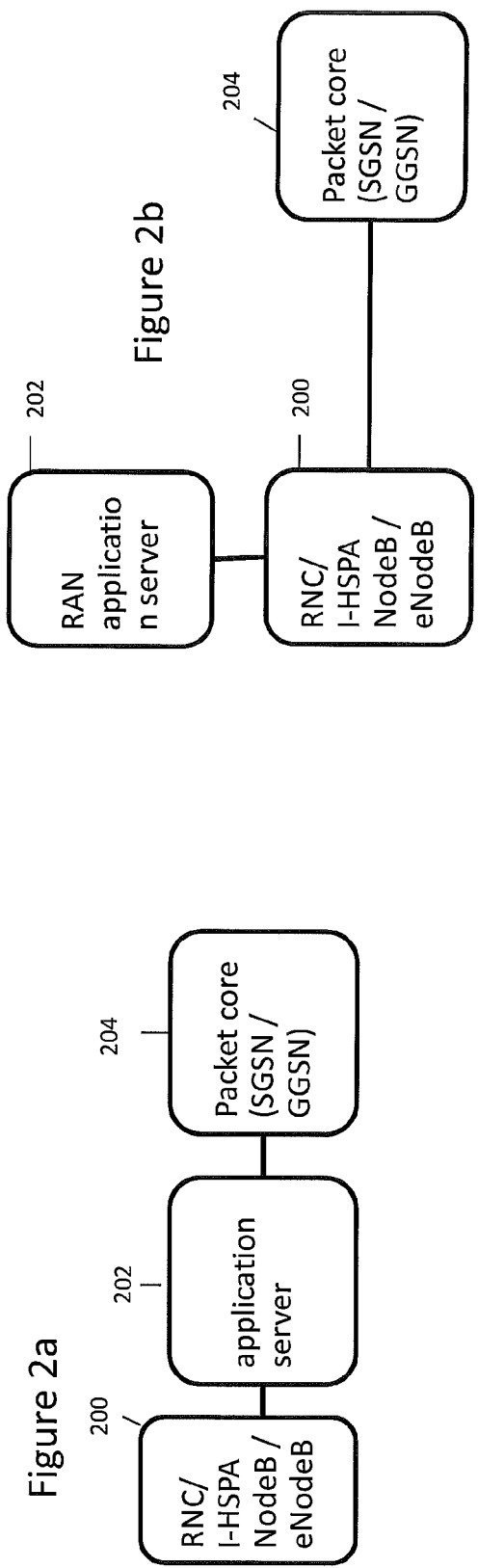
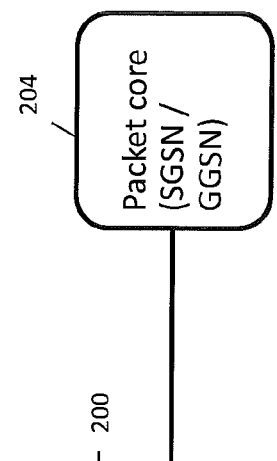
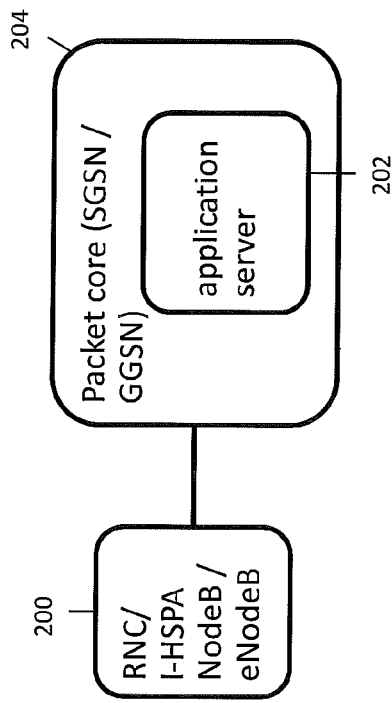
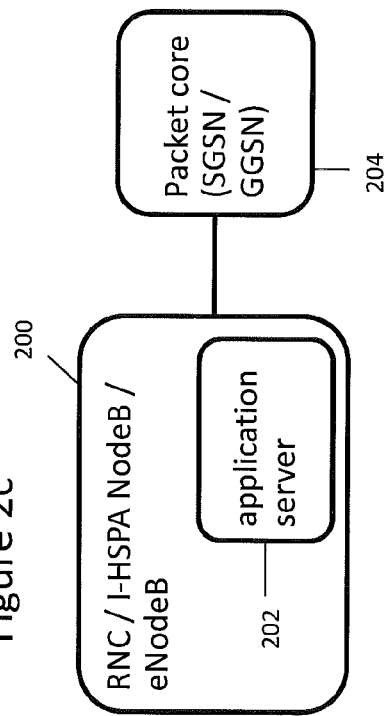
Figure 2a
Figure 2b
Figure 2c
Figure 2d

METHODS AND APPARATUS FOR PROVIDING OFFLOAD CONFIGURATION INFORMATION FOR AN APPLICATION

CROSS REFERENCE TO RELATED APPLICATION

This application claims priority from U.S. Provisional Patent Application No. 61/641,531, filed on May 2, 2012, the disclosure of the prior application is hereby incorporated by reference in its entirety.

FIELD OF THE DISCLOSURE

Some embodiments relate to methods and apparatus and in particular but not exclusively to methods and apparatus for use in the context of offload applications.

BACKGROUND

A communication system can be seen as a facility that enables communications between two or more entities such as a communication device, e.g. mobile stations (MS) or user equipment (UE), and/or other network elements or nodes, e.g. Node B or base transceiver station (BTS), associated with the communication system. A communication system typically operates in accordance with a given standard or specification which sets out what the various entities associated with the communication system are permitted to do and how that should be achieved.

Wireless communication systems include various cellular or other mobile communication systems using radio frequencies for sending voice or data between stations, for example between a communication device and a transceiver network element. Examples of wireless communication systems may comprise public land mobile network (PLMN), such as global system for mobile communication (GSM), the general packet radio service (GPRS) and the universal mobile telecommunications system (UMTS).

A mobile communication network may logically be divided into a radio access network (RAN) and a core network (CN). The core network entities typically include various control entities and gateways for enabling communication via a number of radio access networks and also for interfacing a single communication system with one or more communication systems, such as with other wireless systems, such as a wireless Internet Protocol (IP) network, and/or fixed line communication systems, such as a public switched telephone network (PSTN). Examples of radio access networks may comprise the UMTS terrestrial radio access network (UTRAN) and the GSM/EDGE radio access network (GERAN).

A geographical area covered by a radio access network is divided into cells defining a radio coverage provided by a transceiver network element, such as a base station or Node B. A single transceiver network element may serve a number of cells. A plurality of transceiver network elements is typically connected to a controller network element, such as a radio network controller (RNC).

A user equipment or mobile station may be provided with access to applications supported by the core network via the radio access network. In some instances a packet data protocol (PDP) context may be set up to provide traffic flows between the application layer on the user equipment and the application supported by the core network.

SUMMARY

According to an embodiment, there is provided a method comprising: providing to an application environment, offload configuration information for an application and application information, said application information comprising one or more of network properties and operator properties for said application.

The at least one or more of network properties and operator properties may comprise network and/or operator properties relating to deployment of said application in a virtual environment.

The method may comprise providing to said application environment information defining said application.

The application information may comprise identity information relating to said application.

The application information may comprise information defining which of a plurality of data streams is permitted to access an application.

The application information defining which of a plurality of data streams is permitted to access an application may comprise one or more of bearer parameters, subscriber identification information and information identifying a server from which to query application policy.

The application information may comprise information about a priority of an application with respect to at least one other application.

The application information may comprise information about one or more of charging with respect to said application; information about lawful interception of said traffic and priority of application for recovery.

The application information may comprise a certificate certifying said application information.

According to an embodiment, there is provided a method comprising: receiving offload configuration information for an application and application information, said application information comprising one or more of network properties and operator properties for said application The receiving may be in an application offload environment.

The method may comprise checking said certificate.

The method may comprise checking the validity of the application information.

The checking of the validity of said certificate may comprise checking using an encryption key.

The checking of the validity of said certificate may comprise checking using a private key of a certifier.

The method may comprise checking the validity of the application information by calculating a digest for at least part of said application information and comparing to at least one digest provided in said application information.

According to another embodiment, there is provided an apparatus which is configured to perform the previous method(s). The apparatus may comprise a management entity. The apparatus may be provided in an application environment. The application environment may comprise a server. In some embodiments, the apparatus may comprise an application management agent.

A computer program comprising program code means adapted to perform the method(s) may also be provided. The computer program may be stored and/or otherwise embodied by means of a carrier medium.

According to another embodiment, there is provided an apparatus comprising at least one processor and at least one memory including computer code for one or more programs, the at least one memory and the computer code configured, with the at least one processor, to cause the apparatus at least to: provide to an application environment, offload configuration information for an application and application information, said application information comprising one or more of network properties and operator properties for said application.

The at least one or more of network properties and operator properties may comprise network and/or operator properties relating to deployment of said application in a virtual environment.

The at least one memory and the computer code may be configured, with the at least one processor, to cause the apparatus to provide to said application environment information defining said application.

The application information may comprise identity information relating to said application.

The application information may comprise information defining which of a plurality of data streams is permitted to access an application.

The application information defining which of a plurality of data streams is permitted to access an application may comprise one or more of bearer parameters, subscriber identification information and information identifying a server from which to query application policy.

The application information may comprise information about a priority of an application with respect to at least one other application.

The application information may comprise information about one or more of charging with respect to said application; information about lawful interception of said traffic and priority of application for recovery.

The application information may comprise a certificate certifying said application information.

The apparatus may comprise a management entity. The apparatus may be provided in an application environment. The application environment may comprise a server. In some embodiments, the apparatus may comprise an application management agent.

The apparatus may comprise a management entity. The apparatus may be provided in an application environment. The application environment may comprise a server. In some embodiments, the apparatus may comprise an application management agent.

According to another embodiment, there is provided an apparatus comprising at least one processor and at least one memory including computer code for one or more programs, the at least one memory and the computer code configured, with the at least one processor, to cause the apparatus at least to receive offload configuration information for an application and application information, said application information comprising one or more of network properties and operator properties for said application The receiving may be in an application offload environment.

The at least one memory and the computer code may be configured, with the at least one processor, to cause the apparatus to check said certificate.

The at least one memory and the computer code may be configured, with the at least one processor, to cause the apparatus to check the validity of the application information.

The at least one memory and the computer code may be configured, with the at least one processor, to cause the apparatus to check of the validity of said using an encryption key.

The at least one memory and the computer code may be configured, with the at least one processor, to cause the apparatus to check the validity of said certificate using a private key of a certifier.

The at least one memory and the computer code may be configured, with the at least one processor, to cause the apparatus to check the validity of the application information by calculating a digest for at least part of said application information and to compare to at least one digest provided in said application information.

The apparatus may comprise a management entity. The apparatus may be provided in an application environment. The application environment may comprise a server. In some embodiments, the apparatus may comprise an application management agent.

In the above, many different embodiments have been described. It should be appreciated that further embodiments may be provided by the combination of any two or more of the embodiments described above.

BRIEF DESCRIPTION OF DRAWINGS

Embodiments are described below, by way of example only, with reference to the accompanying drawings, in which:

FIGS. 2a to 2d show different implementations of an application server;

DETAILED DESCRIPTION OF SOME EMBODIMENTS

Embodiments may be used where there are local break out and off load solutions. This may be in the context of a 3GPP radio environment or any other suitable environment. In some embodiments, applications may be deployed to offload points using for example cloud style application deployments.

Local breakout function may provide a mechanism to serve traffic by local applications. In other words, Internet content or the like is brought to a local breakout point. There are many use cases of localization. By way of example, this may be one or more of a local content delivery network (CDN), local transparent caching, local content optimization for a mobile terminal and/or network, local hosting of other kind of services (used by mobile terminals), and local serving of machine-to-machine (M2M) terminals, for example aggregation functions or the like.

Local breakout may be applied alternatively or additionally to other types of radio networks, such as Wi-Fi, WiMax and Femto network. In such embodiments the offload may be between core network and Internet transit/peering.

Traffic off load to local applications may be used in the Gi/SGi interface of a mobile core network. This interface may be between a PDN (packet data network) gateway and operator services. Currently, the number of simultaneous applications on the data path may be limited. Currently, one problem limiting the scaling of either the number of applications or the number of offload points in 3GPP (e—enhanced) UTRAN by for example bringing applications closer to the radio interface has been the amount of integration work required. Even if virtualisation is used to simplify the integration of applications in an offload environment, configuration of networking connectivity may need to be done primarily manually.

Currently, local breakout devices or mobile gateways may be separate from radio devices and application servers. The local breakout devices or mobile gateways currently need to be connected and integrated with complex type solutions through site transport infrastructure. With integration, the traffic routing policy may ensure that the intended application traffic is separated from the other traffic and that the traffic routing policy is in synchronisation with the availability or life-cycle of an application.

Figure 1:
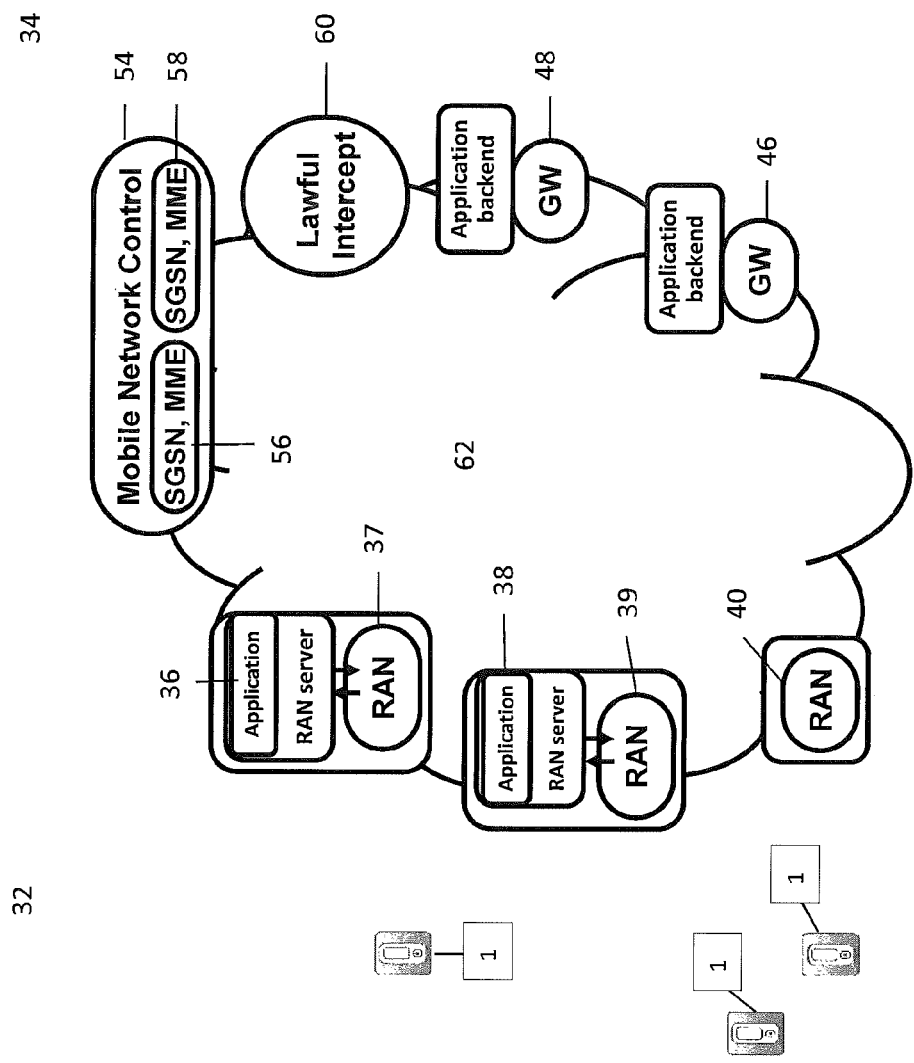
FIG. 1 shows a schematic general overview of a radio access network and a core network according to some embodiments.

Reference is now made to FIG. 1 which shows one example of a distributed off load deployment scenario in an embodiment. In this example, an application server may be integrated at the RAN level with an off load capability. The application backend in FIG. 1 refers to applications which may have distributed and centralized components.

The network architecture broadly comprises a radio access side 32 and a mobile packet core 34. The radio access side comprises user equipment 1. The user equipment are configured to communicate with a respective radio access network. In FIG. 1, the first radio access network RAN 37, the second radio access network 39 and a third radio access network 40 are shown. Each RAN may comprise a plurality of access nodes. The access nodes may comprise any suitable access node. Depending on the standard involved, the access node may be a base station such as a node B or an enhanced node B. The latter refers to the Long Term Evolution (LTE) of the Universal Mobile Telecommunications System (UMTS) standardised by 3GPP (Third Generation Partnership Project). A controller for the base stations may be provided. In some standards, the controller may be a radio network controller. The radio network controller is able to control the plurality of base stations. In other embodiments, a distributed control function is provided and each base station incorporates part of that control function.

The first radio access network 37 comprises an RAN server integrated with an I-HSPA (Internet-High Speed Packet Access) base station 36 or any other type of base station. The RAN server comprises an application server functionality.

The second radio access network 39 has a RAN server integrated with an RNC 38.

It should be appreciated that other embodiments are additionally or alternatively envisaged such as where application functionality is integrated into a node of the RAN, for example the RNC or the base station, without a server. In some embodiments, a physical realisation would be a RNC/base station plus application server in a same integrated hardware. In some embodiments the physical realisation or hardware may be different. So a physical realization may be different (for example an integrated one), even though the software functionality may be the same or similar, in some embodiments.

The mobile packet core 34 comprises mobile gateway node 46 and 48. The mobile packet core 34 also comprises a mobile network control part 54. This part comprises SGSNs (serving GPRS (General Packet Radio Service) Support Node) and MMEs (mobile management entities) entities 56 and 58.

In some embodiments, the mobile packet core 34 may comprise a lawful intercept function which allows authorised authorities to monitor communications.

The radio access part 32 is able to communicate with the mobile packet core via connectivity and transport function 62.

Pass through applications are ones which pass end to end packet flows through modified or un-modified, potentially altering the scheduling of the packets. These are sometimes called virtual appliances. A pass through application may be a virtual machine image with complete application functionality, such as a server containing a transparent cache. Terminating applications are applications which terminate end to end packet flows, providing a service and are therefore visible as IP flow endpoints to terminals using the network. The terminating application may be a virtual machine image with complete application functionality such as a server for a content delivery network. Analytics applications are applications which need to see end to end packet flows but do not modify the packet content or flow scheduling.

When transparent applications deployed as virtual machines are deployed in an Gi/SGi interface, they may be connected normally either as transparent L2 bridges or as L3 next hop routers. Terminating applications may be connected normally by using L3/L4 policy routing. In some environments, the virtual appliances may be deployed as separate servers or clusters of servers, for example a bladed system. The integration may be done with the help of transport nodes, utilising routers, switches or both.

Currently, there are dedicated servers for each type of application. Appliances may use virtualisation which may provide scalability, up and/or down. However, such deployments may be difficult to configure. It has been recognised that the existence of separate management domains for virtualisation and networking may lead to inconsistent configuration of managed objects that overlap management domains. In some implementations, there may be a disparity between the capabilities of embedded bridges in the virtualisation hosts and the capabilities of the attached network. A lack of common configuration information may mean that in some cases, a unified management solution is prevented.

In order to create an automated cloud-style application infrastructure integrated with local breakout in (e)UTRAN or in a similar offload setup at a mobile packet core Gi/SGi interface that fulfils some security, performance and availability levels required by some communication networks, the inventors have noted that one or more of the following areas may cause concern.

Traffic routing to applications: Virtual applications or appliances have different types of relationship with the traffic and/or are interested in different types of traffic. Currently this information is not associated with applications, but is considered to be configured over the management plane of network infrastructure. This may be done with policy routing functionality. As a result, system-specific routing configuration may be used when a new application is introduced Availability & management of traffic routing: With pass-through types of applications there is an issue of availability. If an application is not being capable of conveying traffic any more, the application may need to be isolated otherwise packets routed through it will be dropped. Similar situations may apply when application life cycle management actions require shutting down of the application temporarily, e.g. for a software update. Routers or switches being manually configured for each application may be used, again hindering automation in some scenarios.

Application order: In case a system integrates several applications and some of the applications are pass through, there may be an issue of an order in which traffic should be routed through them; there may be applications targeted to local breakout environments that alter or generate end-to-end traffic, meaning that e.g. a terminating application may not be able to understand traffic if receiving that traffic after a pass through application. Current proposals require manual configuration to address these issues.

Security: It should be noted that applications with different access to traffic may require different levels of trust. Applications that have pass-through access on local breakout or Gi/SGi may have access to all traffic matching the filters. In some situations there may be the possibility of eavesdropping of all users. These types of applications should be from trusted sources, and it may be necessary to verify the trust. In some cases, for end to end security, it is not enough to verify that such application is from trusted source. This may be done manually but may result in unwanted situations where a non-trusted application is allowed access to traffic that is against policy or principles in the operated network. The greater the number of applications, the harder it may be to manage this risk. The inventors have appreciated that this may be because some current proposals do not have the traffic routing configuration associated with an application in a securely verifiable manner.

Business issues: There may be operational models, business models, or contractual reason, why one party (for example a system vendor) should be able to verify that only certain applications manipulate certain traffic in the network. This may be because a vendor is contractually committed to certain level of key performance indicators for the entire system, including applications at a local breakout point or Gi/SGi. Another example is where the business model requires some control to what applications can process what traffic at certain points in the network.

Some embodiments may at least partially address one or more of the above issues.

Some embodiments may provide an application server or application server platform. Some embodiments may use traffic off load. By way of example only, some embodiments may use SIPTO (selected IP traffic off load). SIPTO may for example allow Internet traffic to flow from a femto cell directly to the Internet, bypassing the operator's core network. However, it should be appreciated that SIPTO is one example of traffic off load and other embodiments may alternatively or additionally be used with any other traffic off load.

Some embodiments may provide a traffic configuration for applications and/or virtual appliances that are being integrated into communication networks data paths. Some embodiments may be used with applications using a local breakout. The local breakout point maybe in a mobile radio access network. An application may be integrated into a UTRAN or eUTRAN network element or in a server that is connected or coupled to UTRAN or eUTRAN network element.

Some embodiments may alternatively or additionally be used in a Gi/SGi interface of a 3GPP mobile network, applications being integrated into a mobile packet gateway and/or applications running in a server which is connected or coupled to a mobile packet gateway.

Other embodiments may be used in any other suitable situation. For example some embodiments may be used in the demilitarized zone at the border between a private and a public network, or the like.

Embodiments may use a virtual networking interface for offload traffic. This interface may be capable of hosting pass through, terminating and/or analytics applications.

"Local breakout" scenarios provide the system with the ability to select specific IP flows and route them to the local network, as opposed to tunnelling them to the home network. By way of example, such a scenario is described in 3GPP rel 10 under the name SIPTO (selected IP traffic offload, 3GPP TR 23.829 v10.1). SIPTO So-called "leaky bearer" traffic flow break-out, which may sometimes be called Traffic Offload Function (TOF) allows the extracting or inserting of IP flows of an existing PDP context according to pre-configured traffic filters at for example the RNC or at an Iu interface of the radio access network. By way of example such a Traffic Offload Function (TOF) is described in (Section "5.5 Solution 4: Selected IP Traffic Offload at Iu-PS" of TR 23.829). The terms Traffic Offload Function and "leaky bearer" may be used interchangeably.

It should of course be appreciated, that embodiments may be used in conjunction with other versions of the above mentioned standard and/or different standards.

In embodiments, applications are run within a logical entity called the application server. By way of example only, the application server can be instantiated in one or more of the following scenarios as illustrated in FIG. 2.

The RAN 200 comprises one or more of a RNC, I-HSPA, eNode B, node B, base station and/or any other controller and/or any other type of radio access node. It should be appreciated that the elements which comprise the RAN may be defined by the relevant standard. The packet core elements 204 may comprise a SGSN and/or a GGSN.

In FIG. 2a the application server 202 is provided between the RAN 200 and the packet core 204.

Reference is made to FIG. 2b in which, alternatively or additionally, the application server is connected to the RAN 200 but not directly to the packet core network elements 204. The application server 202 would be connected to the packet core via the RAN.

FIG. 2c shows the application server 202 integrated within the RAN. The application server 202 may be integrated in one or more of the components of the RAN. The RAN 200 is coupled to the packet core 204.

In FIG. 2d, the application server 202 may be integrated within the packet core 204. The application server may be incorporated in one or more of the packet core elements. The packet core 204 is connected to the RAN 200.

A network or system may comprise one or more of the options shown in FIG. 2.

An overview of the system will now be described.

Figure 4:
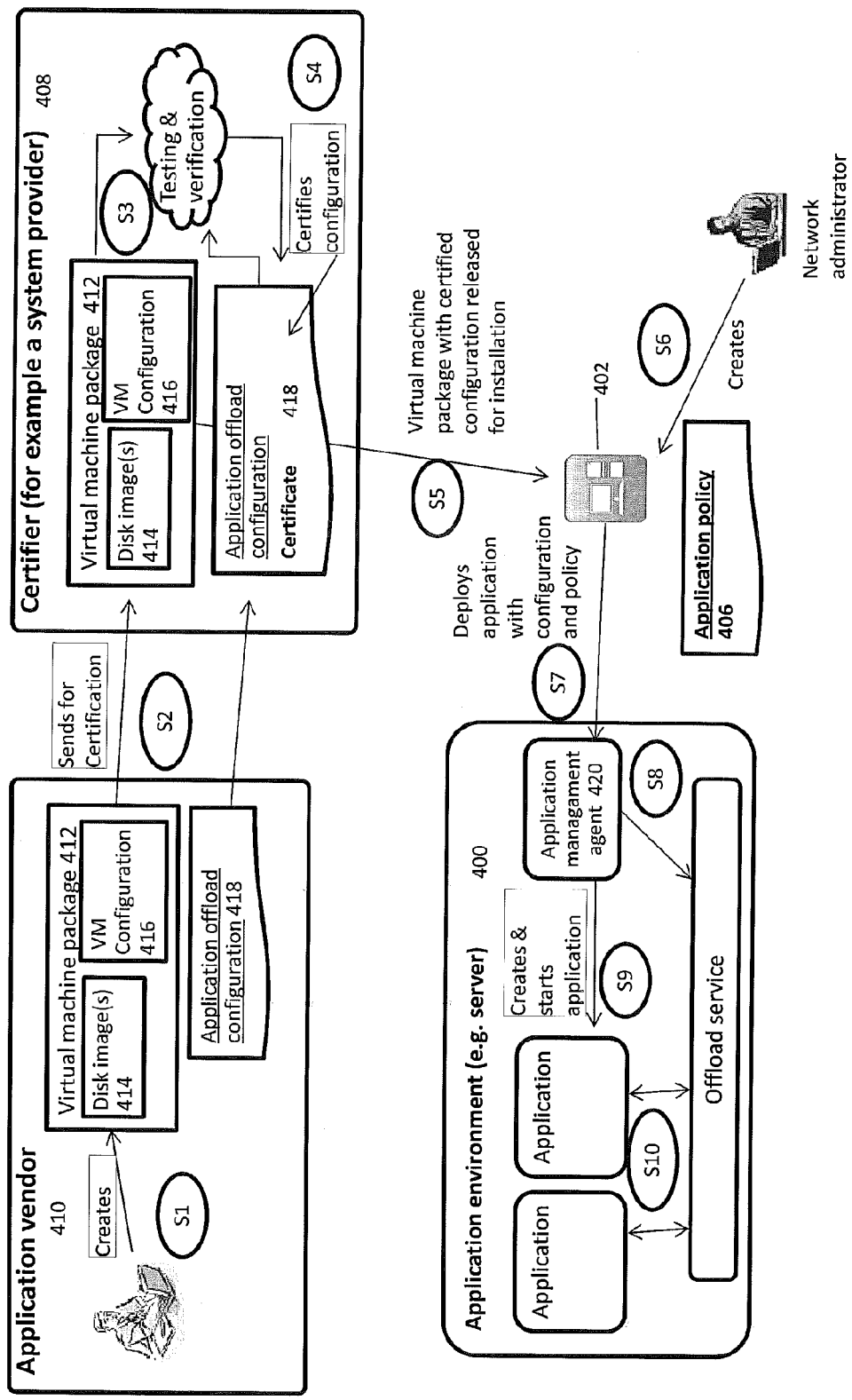
FIG. 4 shows a system and method according to some embodiments.

Reference is now made to FIG. 4. An application environment 400 is shown. An application environment comprises one or more isolated application containers such as virtual machines. The application container run-time environment maybe a virtual machine, a Java virtual machine or the like. The application environment may be provided by for example a server. The server may be a virtualization server with VMM (virtual machine manager).

An application manager 402 is provided. This may be provided in for example an operator operation centre. The application manager may receive an application policy 406.

The application policy 406 may be created in any suitable manner and may be created by for example a network administrator. This application policy may be created by human input and/or by software. Thus the application manager 402 deploys applications into the application environment with an application management agent 420. This provides offload configuration to an off load service, installs packages and instantiates them in containers as virtual machines. An offload service will route relevant traffic flows from the data path to applications and back. The off load service may be provided by software, one or more switches and/or one or more routers.

A certifier 408 is provided. The certifier may be for example a system provider.

An application vendor 410 is also provided which provides the application to be offloaded and application offload configuration.

The application package and application offload configuration will now be described.

An application package is created by for example an application vendor or developer 410. The application developer may develop or compile an application package. The application package may be a virtual machine package 412 or another type of application package that contains application binary information and may contain deployment configuration. The application package is packaged software or a virtual appliance which is configured to run in a virtualised or contained application environment providing isolation between applications and connectivity. This package is configured to run on the application environment 400. The application developer may provide an application offload configuration file, in addition to the application package.

The application package 412 comprises a virtual machine package which comprises binary or disk image(s) 414, and deployment configuration 416 defined by the package format in question. The configuration 416 may comprise information about the format of the image information such as OVF (Open Virtualisation Format) standard format defined by DMTF (Distributed Management Task Force). The binary or disk images 414 and configuration 416 comprise the content of one or more virtual machine image packaging formats, which contain both virtual machine disk image(s) and configuration for the virtual machine. OVF is just one example of such a format. Alternative formats may be used in alternative embodiments.

The Application offload configuration 418 is a deployment time configuration description related to offload configuration. The application offload configuration may be provided separately or packaged together with application package if the package format supports adding custom information.

A typical application package may comprise one or more of for example:
- virtual machine image package, for example for virtual infrastructure or IaaS (infrastructure as a service) environments,
- a virtual system image, consisting of multiple virtual machines; and
- an application package for a platform as a service (PaaS) environment.

The application offload configuration is a set of properties that defines one or more of:
- type of application (terminating, pass through etc)
- delivery type (for example GTP-U (GPRS (general packet radio service) Tunnelling Protocol—User Plane or IP)
- what traffic is to be routed;
- how the traffic is to be routed to the applications;
- the ordering between applications; and
- how the application is linked to an underlying virtual network.

The application offload configuration will now be described in more detail. The configuration comprises a set of configurable properties. The properties may be in machine and/or human readable format. The properties may be provided as a single file or a set of files.

The properties may comprise one or more of the following properties:
- application identification. This may take any suitable format and may be for example one or more of information identifying a vendor, information identifying an application and/or information identifying the version of the application;
- a set of traffic termination points (TTP). A TTP may be a management object and/or a concept for the collection of packet flows to be routed to an application or part of it inside a virtual machine/virtual appliance. Each traffic termination point may comprise one or more of: a traffic termination point identification; traffic selection rules such as packet filter rules; a list of fully qualified domain names registered for the application; a definition of the environment specific TTP interface and/or network options; information about delivery order of this TTP (or application) in relation to other TTP's (or other applications); and/permitted offload directions for the TTP;
- a cryptographic certificate over the offload configuration and application package or parts of it, such as one or all binary images contained by the application package;
- a certificate may be implemented, with help of a separate manifest file. (This may be added by the certifier in some embodiments);
- a manifest file which is a collection of cryptographic hash/digests of both the entire offload configuration and virtual machine package or parts of it, as described above. This manifest file may be certified with a cryptographic algorithm or the like by the certifier in some embodiments. This is for software integrity protection or security in some embodiments;
- each TTP may contain an optionally a list indicating modifiable properties. These properties of the configuration are excluded when calculating cryptographic hash/digests in the manifest. For example, if offload configuration is presented as an XML structure, a temporary copy of the XML structure may be obtained and the modifiable properties may be removed, and only then is the cryptographic hash/digest over the XML structure determined;
- a link to the physical realisation of the connection between the TTP and offload service. The offload service may be a software module or router. For example this may provide the virtual network name, VLAN (virtual local area) tag or other identification used by the platform that implements the TTP's connectivity towards an application.

In one example, the packet filter rules may comprise a set of 5-tuple match filters for field values in an L3 header (IPv4 or IPv6) and/or L4 header (TCP (transmission control protocol), UDP (user datagram protocol), SCTP (stream control transmission protocol) or the like). The match filters may alternatively or additionally contain values with bit masks, ranges and/or the like. Present values within a 5-tuple match filter may be applied with Boolean functions such as an AND operation. A Boolean operator OR may be applied between different 5-tuple match filters within the filter rule set. The filters may be applied in the selection of packets forwarded to the TTP and/or when the application sends data through the TTP.

Terminating applications may, for example, define rules for an IP destination address and/or L4 protocol and/or port to express traffic to be offloaded for that application. Correspondingly, another pass through type of application may, for example, define just a L4 protocol and a set of ports that the application wishes to be offloaded The filtering uses a criteria to check whether the packets are to be offloaded or not. It should be appreciated that the above examples of packet filter rules are only two examples of packet filter rules which may be used. Alternatively or additionally any other method may be used to determine if the packets are to be offloaded or not.

The definition of environment specific TTP interface and/or network options may include information such as expected protocol layers and/or behaviour model of the application in for example termination or pass through situations. As an example, an application may indicate that it is of a pass through type and would behave as a transparent L2 bridge.

The offload directions may comprise one or more of the following options: send to terminal, receive from terminal, send to network, receive from network. A pass through type of application as an example would normally define all four offload directions necessary.

The ordering between the TTPs is defined. This may be done separately both for an uplink offload router (discussed later) and a downlink offload router (discussed later). A TTP may be defined being first or last, or in the middle of the TTP offload chain in one or each direction. For example, a byte caching application—which is a pass through type—may remove the payload of end-to-end packets between two instances of the application, one being located in the application server in (e)UTRAN, and another being located in mobile packet core network. Now, the application needs to define its TTP being last in the uplink offload chain, and first in the downlink offload chain, in order to remove the payload of uplink packets after any other applications; and restore payload of downlink packets before any other application. TTP's for terminating applications with dedicated domain name or IP address may reside in any order in the middle of the uplink and/or downlink offload chain; thus having a middle position for both directions. A more fine grained enumeration with more than three positions (or even two positions) may be used, to allow more detailed ordering.

The properties that are listed as modifiable may be omitted when calculating the hash/digests, allowing the operator or administrator to change some of the values.

This offload configuration may be provided in the application package 412 or may alternatively be provided in a separate package.

The application package format may be any application package format.

The application offload configuration may be provided in machine readable format.

The application offload configuration may be integrated with or supplied with the application package. This may enable, in some embodiments automation without human interaction when applying that configuration during the deployment of an application. This may be for example in a virtualised application environment.

The certifier 408 will now be described.

The certifier may be for example a system vendor or operator that can be provided by any suitable provider. Certification may be manually done and/or may be carried out by for example one or more suitable programmed device(s). The certifier 408 validates the application offload configuration. The certifier may also test or validate the functionality and/or performance of an application. However, this is optional in some embodiments. The certifier may also certify the application offload configuration. The certifier 408 may check the validity of the application offload configuration including its manifest and may create a manifest with the private key. The application with its certified offload configuration may be published, available for installation.

The application offload configuration is, with some embodiments, trusted. By having a trusted application offload configuration, this may allow the possibility of an automated configuration of an application in a virtualised environment in networks sensitive to security and privacy issues, such as mobile networks. The virtual environment may be a cloud style virtualised offload environment. The complete application offload configuration is trusted and made un-modifiable by certifying the configuration files, including at least application offload configuration and optionally the standard configuration part of application package format, using any suitable cryptographic method.

In embodiments, trusted one-to-one relationships between the trusted configuration and the original application version to which the configuration was issued can be created. This avoids the possibility of changing or modifying the application or reusing configuration for another application. This may be achieved in any suitable way and may for example be achieved by including a digest (one way hash function or other suitable function) of part or all of the components in the application package in a form of a manifest. This may alternatively or additionally be achieved by requiring that all digests for the application components in the manifest contained by the application offload configuration are verified by calculating the digests over the corresponding application components in the system and matching to corresponding ones in the manifest, before deploying or starting the application.

In embodiments, a certifier may optionally leave selected properties of an application offload configuration such as IP addresses out of the certification by excluding them when calculating digests of the offload configuration. These selected properties are thus modifiable by an administrator or the like. A list of properties excluded from calculation of the digests and thus modifiable may be provided to the administrator. The list of present and modifiable properties may be included (but not the values of the properties) in the calculation of the digest.

By providing a certified and trusted offload configuration, automated configuration may be enabled in environments where security and/or trust may be an issue. Such environments may be for example mobile networks. The certified and trusted configuration may eliminate the possibility of uncontrolled intentional configurations by the network administrator. This is because at least some of the offload configuration cannot be changed. Further, neither can be the application or parts of that are associated with the offload configuration.

The use of the certifier may mean that independent, one time certification of a configuration of an application and optionally the application itself can be provided.

The application package may be certified later with the independent certificate without the need for recertification of the application offload configuration for the same version of an application, if the application package has its own certificate and manifest, as provided for example by OVF.

Some embodiments may support operator specific configuration by leaving parts of the configuration defined by the application offload configuration modifiable by the network administrator or the like.

In some embodiments, a flexible certification process may be provided. As described previously, the application developer may send just the application offload configuration and optionally digests of application components to the certifier who sends it back certified. Alternatively, the certifier may additionally test and/or verify the application itself.

By the use of the certification, operational situations can be implemented where a party or network operator wants or has to have control of certified applications capable of running on an offload platform. This may be for example to guarantee that only tested and/or verified applications are installed for control reasons.

The application policy 406 will now be described in more detail.

The network policy may define generic operator/network specific properties of applications and may be modifiable by a network administrator. The application policy may comprise a set of configurable properties. These may define operation specific policies for the application.

The application policy may contain one or more of the following:
application identity information such as application vendor information, application name information, version information and/or may be as defined in the offload configuration;

in the case of network offload, the policy may define rules as to which PDP contexts and/or PDN connections are entitled to access a particular TTP. For example, this may be achieved by defining one or more bearer parameters such as traffic class, other RAB (radio access bearer) parameters and/or or the like. Additionally or alternatively, this may be achieved by for example defining subscriber identification information. For example, ranges of IMSI (International Mobile Subscriber Identity), MCC (Mobile cloud computing) and/or MNC (mobile network code) may be defined. Alternatively or additionally information identifying a policy server from which it is possible to query a per subscriber application policy. In some embodiments, this latter option may be an alternative to the defined subscriber information;

the application's criticality for recovery purposes;

the priority of the application and each of its TTPs for overload protection purposes;

the charging characteristics for the traffic flows passing through each TTP;

whether or not there is a need for lawful interception for the traffic passing through each TTP;

manifest over the policy, and operator certificate for the manifest. This may allow a trusted person and/or device at the operator to configure the policy one time to be applied for an application version.

Embodiments may provide a machine readable application policy. This may define operator and/or network specific properties for the application and its TTP. This is in addition to the certified offload configuration. This policy may enable the definition of the static policy per PDP context types. This may be based on RAB parameters of which TTP is enabled for the matching PDP contexts. The policy may enable the definition of a simple static application TTP policy per subscriber groups. This may be based on IMSI information and/or network code. Alternatively or additionally, some embodiments may allow the definition of a policy server-based per subscriber application policy.

Some embodiments may allow the creation of a trusted and automated application policy. This may be achieved by inserting the manifest and operators signed certificate (provided by the certifier) into the application policy. This certificate may be checked at deployment and/or the start time of an application. A trusted policy may be associated to a particular version of an application by referring to the unique application identity in the trusted application offload configuration.

The application policy configuration may be automated in an automated application deployment. In some embodiments this may be facilitated by the machine readable policy supplied with the application to the target application environment. The trusted policy configuration may be certified. This certification may be done by an operator.

In some embodiments, the rights to create policies may be limited to trusted devices or individuals at a network operator.

In some embodiments, an enablement of automated and trusted configuration for charging and/or lawful interception properties per application TTP may be protected by an operator certificate.

In some embodiments, the creation of trusted, automated operator specific policies for applications may be provided. This may be per TTP application. This may provide priority of applications during overload situations, criticality of applications in failure scenarios, charging criteria and/or interception criteria.

In some embodiments, operator specific application policy configuration may be separated from the rest of the offload configuration that is more globally applicable.

The application policy may be provided to the application management agent or application manager 402. The application manager may be a local agent of an Iaas/Virtualization infrastructure.

The application policy may be implemented in any suitable way and may for example be an XML file.

In some embodiments, the operator or administrator of a network may configure application policy. The operator or administrator may deploy new applications and manage the new applications with the application manager The application manager will now be described.

The application manager 402 may be configured to pass the application policy with the application to an application management agent 420 of the application server 400. In some embodiments, only part of the application policy may be provided to the application management agent 420. In other embodiments, all of the application policy is provided to the application management agent 420.

The application server will now be described.

Figure 3:
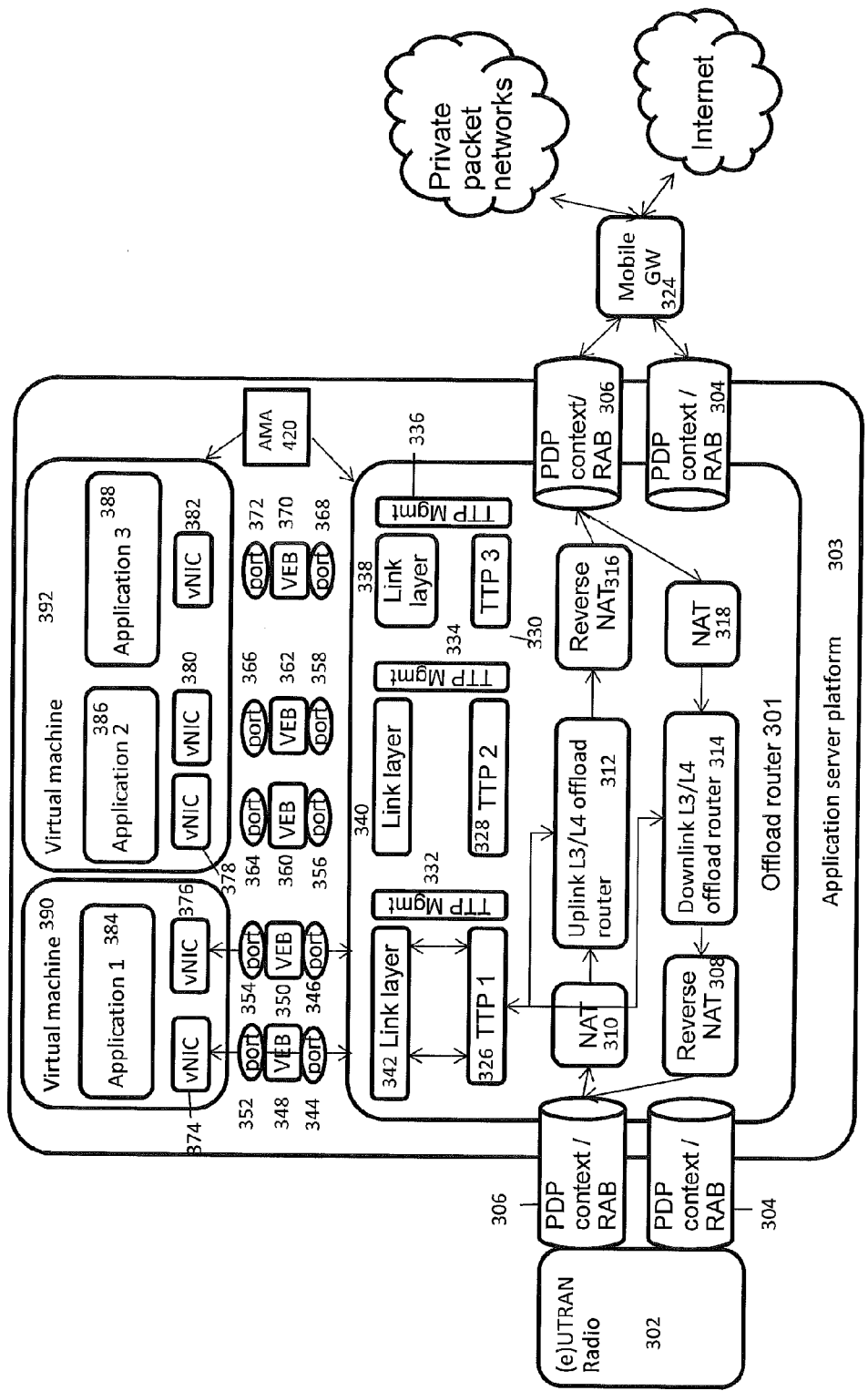
FIG. 3 show a block diagram of one example of an application server.

Reference is made to FIG. 3 which shows a block diagram of an application environment 303. This application server may be the application server of FIGS. 2 and 4 in more detail.

The RAN 302 provides PDP contexts/radio access bearers 304 and 306. For simplicity, the processing of the PDP context/RAB 304 is not described. This Figure only shows the packet flow for the PDP context/RAB 306. The PDP context or PDN connections are intercepted by an off load router block 301. If the packets at the interception point were encapsulated in the GTP-U protocol, the GTP-U protocol is decapsulated in order to provide end to end IP packets to the NAT (network address translation). If the packet is not identified as an Internet protocol packet it will be passed through transparently.

The NAT block 310 performs network address translation. This is sometimes referred to as one-to-one NAT. This may be for example as defined in IETF RFC 2663. The NAT block may translate the user equipment's IP address into a private IP address being visible to the application in the virtual network domain. The addresses may be allocated from one or more of the private IP subnets defined in for example IETF RFC 5735. Any other suitable address allocation may be used in alternative embodiments.

The NAT block may carry out the translation when a packet from a PDP context 306 enters an uplink offload router 312 or a downlink offload router 314. This may hide the original IP address of the user equipment which improves privacy. This is because the user equipment gets a different address each time the user equipment enters the service area of the application server. This may solve the issue of potentially overlapping IP addresses. This solution may provide a limited and known private IP subnet for user equipment which is used for routing inside the application virtual machine.

The output of the NAT 310 is provided to the uplink L3/L4 off load router 312. This offload router will implement selective offload based on filter rule set per traffic termination point TTP. The rule set may comprise L3 (IP) and/or L4 (TCP, UDP, SCTP or the like) matching rules which are matched against the header of each packet. The rule set also includes directions indicating where the application is allowed to send or receive traffic (from/to terminal, from/to network (e.g. the Internet)). The offload router may implement routing between applications based on ordering rules defined for TTPs. The offload routers may support different rule sets for each PDP context or PDN connection.

For example, a web service application may, for example, define a TTP match filter rule set as follows: a single 5-tuple with a specific IP destination address of A.B.C.D; protocol ID of 6 (TCP); port 80 (HTTP); allow receive from UE and send to UE; and be located in the middle of TTP offload chain both in uplink and downlink direction.

In another example, a pass through type of byte caching application may, for example, define a match filter rule set with a single 5-tuple defining only protocol ID of 6 (TCP); allow receive and send from both directions; and be located as a last TTP in the uplink offload chain and first TTP in the downlink offload chain.

In FIG. 3, three traffic termination points TTP 326, 328 and 330 are shown. In other embodiments more or less than three TTPs may be provided. Based on the filter rule sets, relevant packets are passed to the respective traffic termination points in a defined order. The traffic termination points may comprise a set of properties with the application offload configuration that defines a subset of all traffic flows to be routed to an independently managed endpoint within an application. An application offload configuration may comprise one or more TTPs.

Each traffic termination point has a link layer. Link layer 342 is associated with the first TTP 326, link layer 340 is associated with the second TTP 328 and link layer 338 is associated with the third TTP 330. Associated with each TTP is a respective TTP management function. The first TTP management function 332 is associated with the first TTP 326. The second TTP management function 334 is associated with the second TTP 328. The third TTP management function 330 is associated with the third TTP 330.

Dedicated virtual networks are used for each traffic termination point. The virtual network typically comprises a virtual Ethernet bridge VEB. In the case of pass through applications there are two virtual Ethernet bridges per TTP. One will carry traffic between the UE and the application and the other carries traffic between the application and the network. In the case of terminating applications, there will be one VEB per TTP. In the example shown in FIG. 3, the first TTP 326 is associated with a pass through application. Accordingly, there is a first VEB 348 and a second VEB 350 associated with the first TTP 326.

In the case of the second TTP 328, that is also associated with a pass through application and accordingly, there is VEB 360 and VEB 362 associated with that second TTP 328. The third TTP 330 is a terminating application and accordingly, there is one VEB 370. The use of dedicated VEB's are able to isolate applications from being capable of intercepting or generating traffic other than destined to it according to offload filter rule sets; for example, vNICs 374 and 376 of virtual machine 390 are only connected to VEBs 348 and 350, and therefore neither application 384 nor virtual machine 390 can use VEBs 360, 362 and 370 of other applications. The use of two dedicated VEBs for a pass through type TTP may enable implementation of either one or both of transparent bridging and L3 next hop routing behaviour of applications.

In the case of the first and second link layer blocks 326 and 340, these blocks will provide pass through application interfaces with transparent Ethernet bridging as follows. There are two VEB's used per TTP. As shown in FIG. 3 each VEB will have one port towards the application and one port towards the offload router. One of the VEBs is used to carry traffic to or from the terminals and the other of the VEBs is used to carry traffic to/from the network. In the case of the first link layer 342, the first VEB 348 has a port 344 towards the platform and a second port 352 towards the application. This VEB is used to carry traffic to/from the terminals.

The second VEB 350 has a port 346 towards the link layer 342 and a second port 354 towards the application. The second VEB is used to carry traffic to/from the network. The link layer block carries end to end IP packets in Ethernet frames. This may be either as they are, on top of the Ethernet and/or encapsulated within another protocol combination such as IP/UDP/GTP-U. The link layer block may set the source of the MAC address in the frame to be equal to the MAC address of the source interface behind port 344 of the link layer 342. The link layer block may set the destination and MAC address in the frame to be equal to the MAC address of the destination interface behind port 346 of the link layer 342. The link layer block may assume the following behaviour from the application. The application acts as an Ethernet bridge passing frames from one VEB 348 to another VEB 350 transparently using the MAC addresses as mentioned previously. The operation works similarly in the opposite direction, where the MAC addresses are swapped. Alternatively or additionally as an alternative to an Ethernet Bridge, an application may modify, terminate or generate packets or alter their scheduling sequence.

In the embodiment shown in FIG. 3, the second link layer 340 is able to provide a pass through application interface with L3 next Hop/IP router mode. Again, there are two VEB per TTP. The first VEB 360 is used to carry traffic to/from terminals and has a port 356 towards the link layer 340 and a second port 364 towards the application. The other of the VEBs 362 is used to carry traffic to/from the network. The second VEB 362 has a first port 358 towards the link layer 340 and a second port 366 towards the application. The link layer will select the destination MAC address in the frame to be equal to the MAC address of the vNIC (Virtual network interface controller) 378 behind port 364 in the virtual machine 392. Each of the interfaces of link layer 340 behind ports 356 and 358 act as an IP Gateway or router for the application. The link layer 340 will assume the following behaviour from the application. The application acts as an IP router, routing packets from one VEB 360 to another 362 or in opposite direction. There is a route towards the destination subset for translated terminal IP addresses through vNIC 378 to VEB 360. The default route for offload traffic is through vNIC 380 to the other VEB 362. It is possible for an application to modify, terminate or generate packets or alter their scheduling/sequence.

In one embodiment, additionally or alternatively neither IP protocol nor ARP (address resolution) protocol is needed to be available in the interfaces of the link layer of the off load router that connect to the applications. This is assuming that the MAC addresses of the two vNICs in each application virtual machine are known by the link layer of the data router for example by the means of configuration. Additionally or alternatively, the MAC addresses of the two interfaces of the link layer of the data router are known by each application virtual machine for example via configuration. Alternatively or additionally, the application virtual machine have the ability to configure static MAC address resolution for IP addresses that represent the two interfaces of the link layer of the offload router. This would be instead of running the address resolution protocol ARP for these addresses.

The third link layer block 338 provides a terminated application interface. In some embodiments, this may be realised as a simplified one interface version of the transparent Ethernet bridging or L3 next hop/routed mode. Only the interface towards the terminal may be required. Accordingly, one VEB 370 is the only VEB for the third TTP 330. The VEB 370 has a first port 368 towards the link layer 338 and a second port 372 towards the application. This link layer may provide an analytics application interface. In practice, this may be realised as either of the other interfaces, but without forwarding any frames sent to the application or virtual appliance. In this case, the offload router forwards a copy of an end-to-end packet.

In some embodiments, the TTP management blocks 332, 334 and 336 may be optional. The TTP management blocks where provided may provide supervision of the respective TTP. The TTP may be isolated if the application is detected as not being capable of handling traffic. For example, the offload router may stop forwarding packets to an isolated TTP. The TTP management block may provide supervision for pass through applications by for example sending supervision packets through the TTP interface and expecting them to flow through transparently. With transparent Ethernet bridging TTP and L3 next Hop/IP router node, the off load router may send for example an ICMP (internet control message protocol) echo request using a non-reserved IP address from the translated user equipment subnet and expect to see a pass through transparently. In other words, no echo reply is seen. The TTP management block may also provide supervision for terminated applications and may use any standard upper level mechanism besides ICMP echo request/response.

The application server platform also has an application management agent 420. The application management agent 420 is responsible for the life-cycle management of the application containers. In other words, the agent is a virtual machine monitor agent. The application container is the contained virtual environment where the application runs, for example a virtual machine, a virtual PaaS application container or a an application virtual machine. The lifecycle provides operator states which are operator controlled from the application manager 402. These states may be one or more of Start/Stop, Suspend/Resume, Save/Restore.

The application management agent may verify the certificate in the offload configuration, ensuring the configuration and defined parts of the application are valid.

The application management agent may supply the verified offload configuration to the off load service or router.

The application management agent may provide an interface for the application manager 402 to manage the application life-cycle. This provides an APIs (application programming interface)/interface through which the application manager can control the lifecycle management.

The flow of a packet from a UE to the application and back will now be described. The packet is received from the RAN 302. This packet is on the PDP context/radio access bearer 306. The packet goes to the network address translator 310. The packet with the translated address is sent to the uplink offload router. This assumes that the address satisfies the filter criteria associated with a particular application. Depending on the application in question, the packet is sent to one of the TTPs. The packet will then be passed by the link layer and associated VEB to the application. The application may generate a response to that packet and this is output by the other VEB, link layer and TTP to the down link offload router. The packet is output to the reverse NAT 308 which reverses the address. That packet is then output to the PDP context/RAB 306 and output back to the RAN 302.

The flow of a packet from UE to the internet or the like will now be described. The packet is received from the RAN 302. This packet is on the PDP context/radio access bearer 306. The packet goes to the network address translator 310. The packet with the translated address is sent to the uplink offload router. This assumes that the address satisfies the filter criteria associated with a particular application. Depending on the application in question, the packet is sent to one of the TTPs.

The packet will then be passed by the link layer and associated VEB to the application. The application may generate a response to that packet and this is output by the other VEB, link layer and TTP to the uplink offload router 312. The packet is output to the reverse NAT 316 which reverses the address. That packet is then output to the PDP context/RAB 306 to the mobile gateway 324.

The flow of a packet from the internet or the like to the UE will now be described. The packet is received from the mobile gateway 324. This packet is on the PDP context/radio access bearer 306. The packet goes to the network address translator 318. The packet with the translated address is sent to the downlink offload router. This assumes that the address satisfies the filter criteria associated with a particular application. Depending on the application in question, the packet is sent to one of the TTPs. The packet will then be passed by the link layer and associated VEB to the application. The application may generate a response to that packet and this is output by the other VEB, link layer and TTP to the downlink offload router 314. The packet is output to the reverse NAT 308 which reverses the address. That packet is then output to the PDP context/RAB 306 to the RAN 302.

For some terminating applications, the offload router 312 will provide packet to the third TTP 328. That packet will then be provided to the third application. The packet terminates in the application. It should be appreciated that downlink packets can be treated in the same way for terminating applications.

The application manager may be a virtual machine/Iaas cloud manager. This may deploy application packages to application environments and provide an interface to manage the lifecycle, as discussed previously. The application configuration tool may be centralized or integrated in the same server as the application environment.

Some embodiments may provide two simple, IP/Ethernet based virtual networking interfaces for SIPTO offload traffic, extracted from PDP contexts/PDN connections in mobile networks. These maybe an L2 transparent bridge interface and an L3 next hop/IP routing based interface. However more or less than two interfaces may be provided in other embodiments. Other types of interface may be used in alternative embodiments.

In some embodiments, different packet offload rule sets may be applied per TTP/application, per PDP context/PDN connection and/or per traffic direction (to/from terminal, to/from network).

A mobile GW may comprise or be coupled to an arrangement such as shown in FIG. 3 or an arrangement having at least some of the features of FIG. 3.

For Gi/SGi offload, at least some of the arrangement of FIG. 3 may be used.

A description of the method flow of FIG. 4 will now be described.

In step S1, the application developer compiles an application package as previously discussed. This application package thus comprises application offload configuration, the virtual machine/system image with the configuration information. This is as previously discussed.

The application vendor or developer, in step S2 sends either the entire application package or the offload configuration to the certifier. The certifier may test the application itself or just the offload configuration. Where the certifier is only interested in testing the configuration information, that may, in some embodiments, be extracted from the application package.

In step S3, the certifier may carry out testing and/or verification of the application for example to verify and test its functionality and/or performance. It should be appreciated that this step is optional.

In step S4, the certifier may check the validity of the application offload configuration. This check may include its manifest or similar cryptographic hash/digests and create a certificate based on the manifest or the like. This may use the private key associated with the manifest.

It should be appreciated that in some embodiments, the application vendor or developer may be able to certify the application package itself. This is assuming that this self certification supported by the packaging format.

In some embodiments, certification of the application itself may be carried out by a different party to that certifying the offload configuration. It should be appreciated that in certifying the offload configuration, parts of the application whose cryptographic hash/digest may be included in the manifest of the offload configuration may effectively be certified by the certifier. The manifest may be part of the application offload configuration file or it may be a separate manifest file packaged together with the offload configuration and the certificate that certifies the manifest.

In step S5, the application package with its offload configuration is published and is available for installation. It should be appreciated that this will include the certificate information in or with the application package. This application package may be provided by the certifier to the application manager 402. It should be appreciated that where the certifier only certifies the application offload configuration that the other application information may be sent via a different route to the application manager.

Regardless of this, the certifier may certify part or the entire application package that the offload configuration file is associated with. This is possible if the manifest of the offload configuration contains digests of applications. In one embodiment, the certified offload configuration may be sent back to the application vendor 410. The application vendor may provide the application to the application manager 402 with the certified application offload configuration.

In step S6, the network administrator or operator creates the application policy for the new application. This can be done by a human operator and/or may be computerised. The application policy for the new application and/or new application version may be created. That application policy may be certified. This certification may be done by the network operator or any other suitable entity.

The network administrator or operator may deploy the application in step S7 using the application manager 402. The application manager 402 may provide the application package, the application offload configuration (where separate from the application package) and application policy to the application management agent 420.

In step S8, the application management agent provides the application offload configuration and application policy to the offload server (which may be provided by the off load router of FIG. 3). The validity of the application components included in the manifest of the application offload configuration may be verified by reproducing the digests and comparing the components to the ones in the manifest. The verification may be performed by for example the application management agent 420.

The validity of the certificate in the application offload configuration may be checked against private key of the certifier and/or by some other cryptographic methods. This may be carried out by the off load server or off load router in FIG. 3.

The validity of the application off load configuration may be verified by calculating the digests over the whole configuration, excluding properties listed in the exclusion list and comparing against the digest of the configuration stored in the manifest.

The certificate in the application policy may be checked against the private key of the certifier by for example the offload server. Other cryptographic methods may alternatively or additionally be used The validity of the application policy may be verified by calculating the digest over the whole policy configuration.

In step S9, the application management agent instantiates the application into a virtual machine.

In step S10, the off load router starts providing data to the applications, 384, 386 or 388.

It should be appreciated that the certifier may be a trusted party such as for example a system provider.

Some embodiments may permit the automation and/or verify the traffic routing configuration. This may be done in a machine processable format. Alternatively or additionally, this may be done in a verifiable format e.g. by cryptographic means Some embodiments may permit the implementation of a fully automated application cloud for network applications and appliances that are integrated into the data path in communication networks.

In some embodiments, the application policy configuration may be separated from the offload configuration. However in other embodiments, one party may provide both application policy configuration and offload configuration. Certification may be provided by a different party to the party providing the offload application and/or the application policy. In some embodiments, certification may be provided by a same party to the party providing the offload configuration and/or the application policy.

Some embodiments may be used where there are relatively complex offload configuration and/or relatively high standards for security and/or availability. Some embodiments may be used with virtualization infrastructure and virtual machines. Other embodiments may be used with other types of cloud applications such as PaaS clouds or the like.

Some embodiments may make application deployment simpler in that the risk of configuration error may be reduced or avoided. Some embodiments may reduce the effort required to integrate a new application. Some embodiments may reduce the possibility of misconfiguration by an administrator.

Some embodiments may enable independent one time configuration of an application regardless of the number of deployments in a number of networks.

An appropriately adapted computer program code product or products may be used for implementing some embodiments, when loaded on an appropriate data processing apparatus, for example for determining geographical boundary based operations and/or other control operations. The program code product for providing the operation may be stored on, provided and embodied by means of an appropriate carrier medium. An appropriate computer program can be embodied on a computer readable record medium. A possibility is to download the program code product via a data network. In general, the various embodiments may be implemented in hardware or special purpose circuits, software, logic or any combination thereof. Embodiments may thus be practiced in various components such as integrated circuit modules.

The design of integrated circuits is by and large a highly automated process. Complex and powerful software tools are available for converting a logic level design into a semiconductor circuit design ready to be etched and formed on a semiconductor substrate.

It is also noted herein that while the above describes exemplifying embodiments of the invention, there are several variations and modifications which may be made to the disclosed solution without departing from the scope of the present invention.

The invention claimed is:

1. A method comprising:
providing to an application environment, offload configuration information for an application and application information, said application information comprising one or more of network properties and operator properties for said application,
wherein said application information comprises information defining which of a plurality of data streams is permitted to access an application.

2. A method as claimed in claim 1, wherein the at least one or more of network properties and operator properties comprise network and/or operator properties relating to deployment of said application in a virtual environment.

3. A method as claimed in claim 1, comprising providing to said application environment information defining said application.

4. A method as claimed in claim 1, wherein said application information comprises identity information relating to said application.

5. A method as claimed in claim 1, wherein said application information defining which of a plurality of data streams is permitted to access an application comprises one or more of bearer parameters, subscriber identification information and information identifying a server from which to query application policy.

6. A method as claimed in claim 1, wherein said application information comprises information about a priority of an application with respect to at least one other application.

7. A method as claimed in claim 1, wherein said application information comprises information about one or more of charging with respect to said application; information about lawful interception of said traffic and priority of application for recovery.

8. A method as claimed in claim 1, wherein said application information comprises a certificate certifying said application information.

9. A method comprising:
receiving offload configuration information for an application and application information, said application information comprising one or more of network properties and operator properties for said application,
wherein said application information comprises information defining which of a plurality of data streams is permitted to access an application.

10. A method as claimed in claim 9, wherein said application information comprises a certificate and said method comprises checking a validity of said certificate.

11. A method as claimed in claim 10, wherein said checking of the validity of said certificate comprises checking using an encryption key and/or using a private key of a certifier.

12. A method as claimed in claim 9, wherein the method comprises checking a validity of the application information.

13. A method as claimed in claim 12, wherein said checking the validity of the application information comprises determining a digest for at least part of said application information.

14. An apparatus comprising at least one processor, and at least one memory including computer program code, the at least one memory and the computer program code configured to, with the at least one processor, provide to an application environment, offload configuration information for an application and application information, said application information comprising one or more of network properties and operator properties for said application,
wherein said application information comprises information defining which of a plurality of data streams is permitted to access an application.

15. The apparatus as claimed in claim 14, wherein the at least one or more of network properties and operator properties comprise network and/or operator properties relating to deployment of said application in a virtual environment.

16. The apparatus claimed in claim 14, wherein said application information further comprises at least one of:
identity information relating to said application;
information about a priority of an application with respect to at least one other application;
information about one or more of charging with respect to said application;
information about lawful interception of said traffic and priority of application for recovery; and
a certificate certifying said application information.

17. An apparatus comprising at least one processor, and at least one memory including computer program code, the at least one memory and the computer program code configured to, with the at least one processor, receive offload configuration information for an application and application information, said application information comprising one or more of network properties and operator properties for said application,
wherein said application information comprises information defining which of a plurality of data streams is permitted to access an application.

18. The apparatus as claimed in claim 17, wherein said application information comprises a certificate and wherein the at least one memory and the computer program code are configured with the at least one processor to check a validity of said certificate.

19. The apparatus as claimed in claim 18, wherein the at least one memory and the computer program code are configured with the at least one processor to check using an encryption key and/or using a private key of a certifier.

20. The apparatus as claimed in claim 17, wherein the at least one memory and the computer program code are configured with the at least one processor to check a validity of the application information.

21. The apparatus as claimed in claim 20 wherein the at least one memory and the computer program code are configured with the at least one processor to check the validity of the application information comprising determining a digest for at least part of said application information.

22. A computer program, embodied on a non-transitory computer readable medium, the computer program, when executed by a processor, causes the processor to
provide to an application environment, and
offload configuration information for an application and application information,
said application information comprising one or more of network properties and operator properties for said application, and information defining which of a plurality of data streams is permitted to access an application.

23. A computer program, embodied on a non-transitory computer readable medium, the computer program, when executed by a processor, causes the processor to:
receive offload configuration information for an application and application information, said application information comprising one or more of network properties and operator properties for said application, and information defining which of a plurality of data streams is permitted to access an application.

* * * * *